(No Model.) 8 Sheets—Sheet 1.

N. NEWMAN.
CASH CARRIER.

No. 455,350. Patented July 7, 1891.

Fig. 1.

Witnesses
Chas. J. Williamson
Henry C. Hazard

Inventor:
Nelson Newman by
Prindle & Russell, his Attys (No Model.)  8 Sheets—Sheet 2.

N. NEWMAN.
CASH CARRIER.

No. 455,350. Patented July 7, 1891.

Fig. 2.

Witnesses:
Chas. J. Williamson
Henry C. Hazard

Inventor:
Nelson Newman, by
Prindle and Russell, his Attys (No Model.)　　　　　　　N. NEWMAN.　　　　　8 Sheets—Sheet 4.
CASH CARRIER.

No. 455,350.　　　　　　　　　Patented July 7, 1891.

Witnesses:
Chas. J. Williamson
Henry C. Hazard

Inventor:
Nelson Newman, by
Prindle and Russell, his Attys.

(No Model.) 8 Sheets—Sheet 6.

N. NEWMAN.
CASH CARRIER.

No. 455,350. Patented July 7, 1891.

Witnesses:
Chas. J. Williamson
Henry C. Hazard

Inventor:
Nelson Newman, by
Crindle & Russell, his Attys

(No Model.) 8 Sheets—Sheet 7.

N. NEWMAN.
CASH CARRIER.

No. 455,350. Patented July 7, 1891.

Witnesses:
Chas. J. Williamson
Henry C. Hazard

Inventor:
Nelson Newman by
Prindle & Russell, his Attys (No Model.)  8 Sheets—Sheet 8.

N. NEWMAN.
CASH CARRIER.

No. 455,350. Patented July 7, 1891.

Witnesses:
Chas. J. Williamson
Henry C. Hazard

Inventor:
Nelson Newman, by
Crindle & Russell, his Attys

UNITED STATES PATENT OFFICE.

NELSON NEWMAN, OF SPRINGFIELD, ILLINOIS, ASSIGNOR, BY MESNE ASSIGNMENTS, TO THE LAMSON CONSOLIDATED STORE SERVICE COMPANY, OF NEW JERSEY.

CASH-CARRIER.

SPECIFICATION forming part of Letters Patent No. 455,350, dated July 7, 1891.

Application filed March 4, 1886. Serial No. 193,993. (No model.)

*To all whom it may concern:*

Be it known that I, NELSON NEWMAN, of Springfield, in the county of Sangamon, and in the State of Illinois, have invented certain new and useful Improvements in Cash-Carriers; and I do hereby declare that the following is a full, clear, and exact description thereof, reference being had to the accompanying drawings, in which—

Letters of like name and kind refer to like parts in each of the figures.

My invention is designed to render practicable and safe the use of a single-track cash-carrier; and to this end it consists in the cash-carrier system or apparatus and in the construction, arrangement, and combination of the parts thereof, as hereinafter specified.

My apparatus consists partly of a single-wire track A, which is intended to start from the desk of the cashier, and after passing around the store to return to said desk, there being at any desired number of points stations for receiving and delivering carriers B. Each station is in part composed of a horizontal platform C, which is supported at a suitable height above the counters preferably by means of a rod D, that is secured to and extends downward from the ceiling of the room. From the lower side of said platform four rods E extend downward in parallel lines, and at their lower ends are connected together by means of a cross-bar F. The front edge of the platform C has an upward-turned flange $c$, that forms part of the track A, and to the ends of which are attached the wire that constitutes the body of the same. One-half lengthwise of said platform is used for the starting of carriers B, and within such portion at its front is formed a right-angled notch $c'$, that has a length somewhat greater than the length of a carrier, and is inclosed, when desired, by means of a plate G, which rests upon the upper side of said platform, and is adapted to slide forward over said notch or rearward from over the same. The front edge of said plate has an upturned flange $g$, which, when the same is at the forward limit of its motion, coincides with the flanges $c$ and $c$ at each end and forms a continuation of the same.

Extending between and fitting around the rods E and E, beneath the carrier-starting end of the platform C, is a plate H, which is adapted to slide vertically upon said rods, and is preferably raised, when desired, by means of a cord I, that passes upward over a pulley or around a spool $k$ upon a shaft K, while a second cord I' is secured around a second spool $k'$ upon said shaft, and from thence passes downward within convenient reach of an operative, the arrangement being such that a downward pull upon said cord I' will cause it to unwind from its spool and rotate said shaft and said cord I to be simultaneously wound upon its spool, so as to raise said plate. The weight of the latter will cause it to descend as soon as said operating-cord I' is slackened.

The front edge of the plate or elevator H is provided with an upturned flange $h$, which, when said part is placed against the lower side of the platform C and the plate or movable track-section G is at the rear limit of its motion, fills the space between the track-flanges $c$ and $c$ and forms a continuation of the same. In order that said section G may be automatically moved rearward as said elevator nears the upper limit of its motion, two rods $g'$ are secured to the rear edge of the former, and from thence extend rearward and downward through slots $c^2$, which are provided in said platform, and have such lateral and longitudinal dimensions as to give free play to said section. At the rear edge of said elevator are provided two notches $h'$, which coincide with and engage the lower sides of said rods $g'$ as said part moving upward nears said platform, by which means said inclined rods and said track-section are moved rearward, so as to leave the notch $c'$ free for the entrance of said elevator. When the latter descends, said movable section G is returned to its front normal position by means of a spring L, that presses against the rear end of the arm $g^2$, attached to the track-section and extending rearward therefrom through a guide $g^3$, which is preferably provided with the roller or pulley $g^4$, engaging the upper side of the arm $g^2$.

Each carrier B is suspended from the track A by means of two grooved rollers $b$, which are journaled within a frame $b'$, that has the form shown, the construction being such that the lower sides of said rollers from the rear are unobstructed, and they may be readily placed over or removed from said track. Said frame is preferably connected with the body of said carrier by a single central standard $b^2$.

Figure 10:
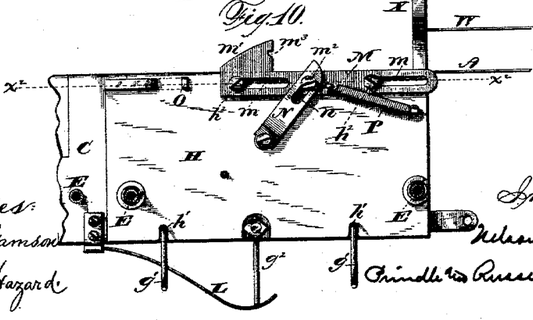
Figure 11:
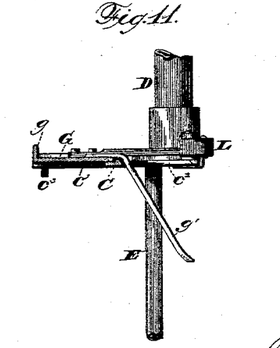
Figs. 11 and 12 are respectively sections upon lines $x$ $x$ and $x'$ $x'$ of Figs. 7 and 8.
Figure 12:
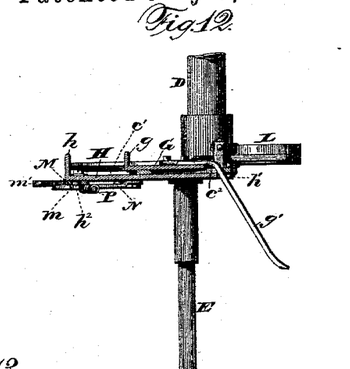
Figure 13:
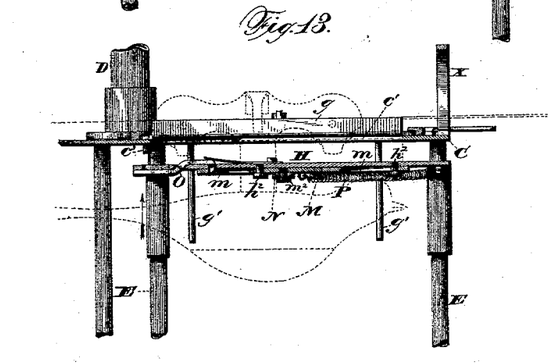
Figs. 13 and 14 are sections upon line $x^2$ $x^2$ of Figs. 8 and 10 and show, respectively, the carrier locking and impulse mechanism when engaging a carrier and after the same has been thrown outward upon the track.
Figure 14:
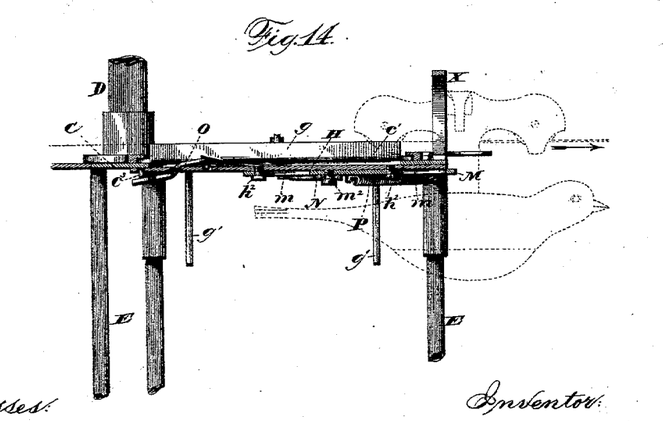

The elevator H is used for placing carriers upon the track A, for which purpose the rollers $b$ of a carrier B are placed upon the track-flange $h$, so as to cause said carrier to be suspended therefrom as from said track. In order that said carrier may be prevented from becoming displaced while said elevator is being raised, and also that it may be impelled upon the track when upon a level with the same, the following-described mechanism is employed, viz: Upon the lower side, at the front edge of the elevator H, is a bar M, that is provided near each end with a longitudinal slot $m$, through which passes a screw $h^2$, that confines said bar in vertical and transverse position, while allowing free longitudinal movement within the limits of said slot. The rear end of the bar M is provided with a lug $m'$, which projects outward, as shown in the drawings, so as to be in position to engage the rear edge of the roller-standard $b^2$ when the carrier B is in place upon the elevator H. This lug $m'$ is provided with a notch $m^2$ to receive and hold a portion of the standard, and the standard itself is provided with two notches $m^4$ $m^4$, one in its rear edge to engage the lug $m'$ and the other in its forward edge. A second short bar N is placed across said bar M and has its rear end pivoted upon the lower face of said elevator, and its front portion, which is provided with a longitudinal slot $n$, connected with said bar M by means of a screw $m^3$, that passes into the latter through said slot. The outer end of the bar N projects to engage the notch $n^4$ in the front edge of the standard $b^2$ when a carrier is in place upon an elevator and said bar M is at the rear limit of its motion. With this construction, with the notch $m^3$ in lug $m'$ engaging the rear edge of of the standard $b^2$ and the notch $m^4$ in such edge of the standard in turn engaging the lug $m'$ and the bar or arm N engaging the notch $m^4$ in the forward edge of the standard, said standard and carrier will obviously be most firmly and steadily in place on the elevator and are kept from swinging or rising movement, which might disengage the rollers from the track-section on the elevator. The bar M is held at the rear limit of its motion by means of a spring-operated pawl O, which is pivoted within the rear end of the elevator H and adapted to engage with the rear end of the contiguous slot $m$, and when released from such engagement said bar is drawn to the front limit of its motion by means of a spring P, that is secured to and extends between its front end and some contiguous portion of the front end of said elevator. When the bar M moves to the front limit of its motion, the outer end of the short bar N is moved forward and inward until out of the path of the track-carrier standard $b$ in the position seen in Fig. 10, where it offers no obstacle to the free forward movement of a carrier B; but when said bar M is again moved to the rear limit of its motion said bar N is thrown outward, as shown in Fig. 1, and, in connection with the lug $m'$, operates to lock the carrier in place and prevent it from moving off from said elevator.

Figure 1:
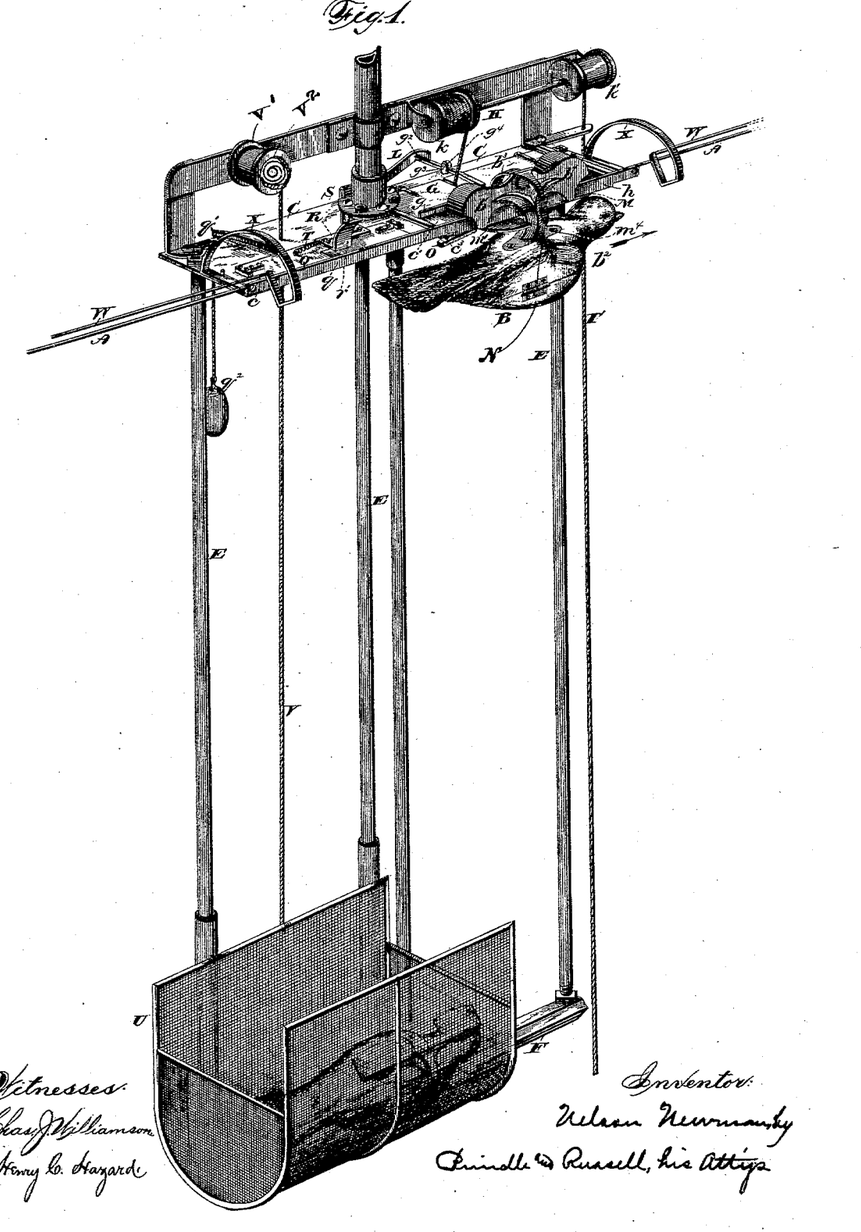
Figure 1 is a perspective view of one of the stations of my apparatus, showing one of the carriers raised to the track and about to move out upon the same.
Figure 2:
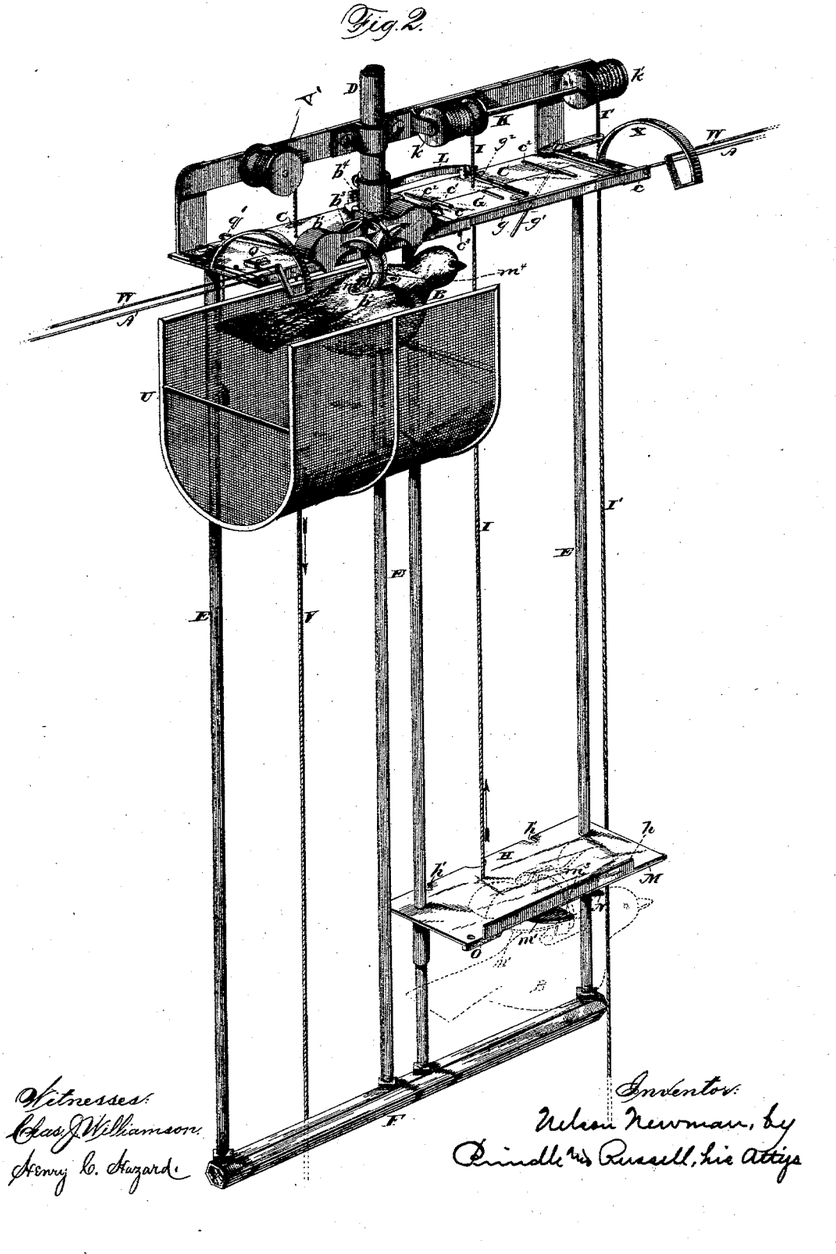
Fig. 2 is a like view of the same with a carrier upon the drop and about to fall into the basket.
Figure 3:
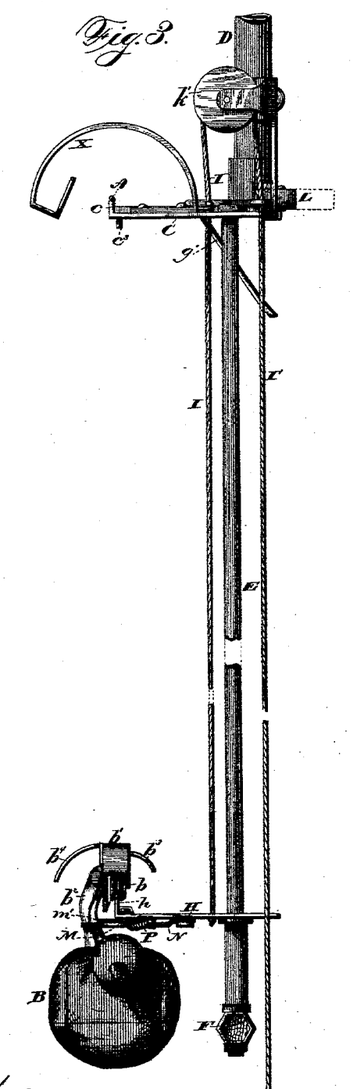
Fig. 3 is an end elevation of the elevator portion of said station, showing a carrier in position upon the elevator and about to be raised to the level of the track.

To place a carrier B upon the elevator H, the rollers $b$ of the former are placed upon the track-flange $h$, with the rear edge of the standard $b^2$ against the lug $m'$, after which, by pressing said carrier rearward with sufficient force to overcome the pressure of the spring P and carry the bars M and N to the positions shown in Fig. 1, said carrier will be locked in place. When the carrier B is raised to position to enable it to run upon the track A, it is released from engagement with the lug $m'$ and bar N by means of a stud $c^3$, which projects downward from the platform C and engages with the rear end or tail-piece of the pawl O at the instant when the elevator H reaches the upper limit of its motion. Such engagement operates to release said pawl from engagement with said bar M, when by the action of the spring P the latter is drawn suddenly forward to the limit of its motion in such direction, which not only releases the front edge of the carrier-standard $b^2$, but gives to said carrier an impulse that sends it out upon the track A with considerable velocity. As soon as a carrier leaves the elevator the latter should be dropped to its normal position, where it is ready to receive another carrier and place it upon the track.

Figure 15:
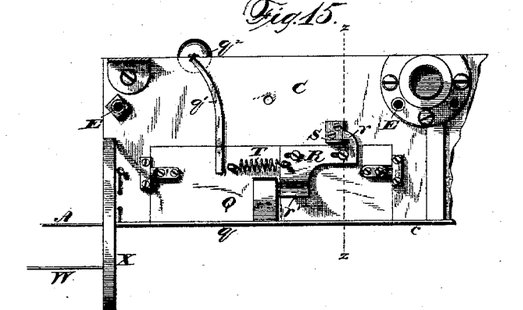
Figs. 15 and 16 are plan views of the upper side of the platform and drop and show, respectively, said drop in its normal position and when tilted to drop a carrier.
Figure 16:
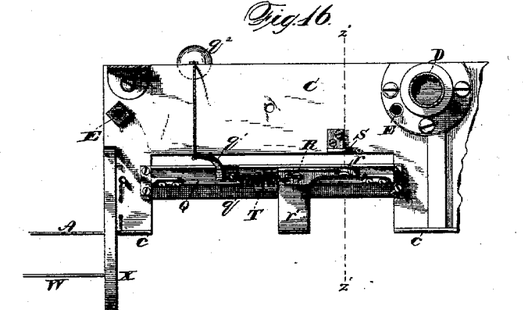
Figure 17:
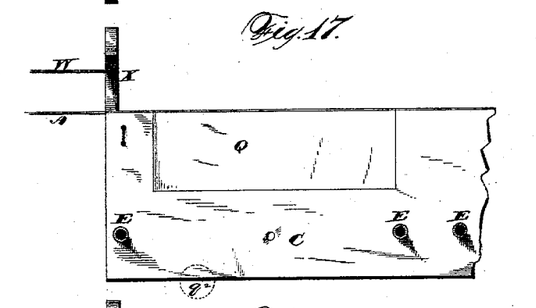
Figs. 17 and 18 are respectively like views of the lower side of the same when the parts occupy the relative positions seen in Figs. 15 and 16, and Figs. 19 and 20 are respectively sections upon lines $z$ $z$ and $z'$ $z'$ of Figs. 15 and 16.
Figure 18:
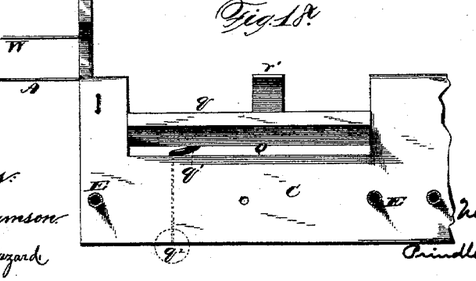
Figure 19:
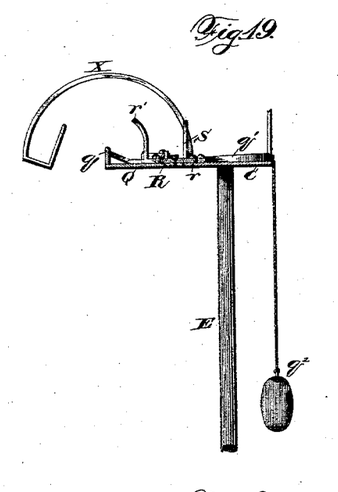
Figure 20:
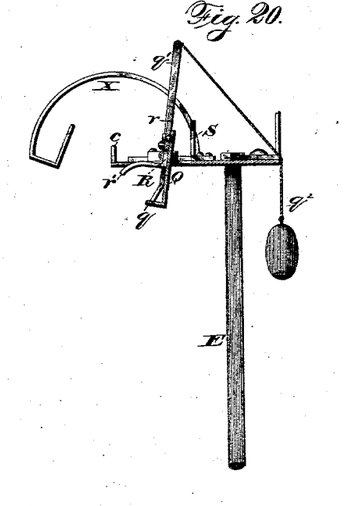

The half of the platform C opposite to that used for the elevator H is employed for the carrier-dropping mechanism, and is also provided with a movable track-section Q, which corresponds in length and width to the section G, but, unlike the latter, is pivoted at its ends slightly in rear of its transverse center to said platform, and is adapted to have its front edge, which is provided with an upward-projecting track-flange $q$, tilted downward to or beyond a vertical line. The tilting track-section Q is held in its normal horizontal position by means of a bar $q'$, which is secured to its upper side and extends rearward over the platform C and has attached to its rear end a weight $q^2$, that will exert a yielding downward pressure upon said bar sufficient to overbalance the weight of the outer portion of said section, but not sufficient to prevent the latter from being tilted downward by the weight of a carrier B when the same is placed upon the track-flange $q$. In order that the tilting section Q may not turn until the carrier which belongs to the station is fairly upon the same, it is locked in a horizontal position by means of a latch-plate R, which is adapted to slide longitudinally upon the upper side at the rear edge of said section, and is provided at its front end with a rearward-projecting lug $r$, that when said plate is at the rear limit of its longitudinal motion is adapted to engage with a catch S, which projects upward from the platform C. Said plate R is held with a yielding pressure at the rear limit of its motion by means of a spring T, as shown in Fig. 15. The tilting section Q is automatically unlocked when a carrier B runs upon its track-flange $q$ by means of an arm $r'$, which projects in a slight curve upward and outward from the outer edge near or at the rear end of the locking-plate R, and an arm $b^3$, that projects in a curve inward and downward from the inner side at the longitudinal center of the carrier-frame $b'$ of said carrier in position to impinge upon said arm $r'$ as said carrier moves upon said tilting section. As thus arranged, the momentum of the carrier B when moving upon the tilting section Q is sufficient to overcome the resistance of the spring T and moves the locking-plate R to the front limit of its motion, so as to unlock said section Q and permit it to turn downward and drop said carrier. After said carrier has become disengaged from said tilting section the latter is returned to its normal position by the operation of the overbalancing-weight $q^2$ or spring, said locking-plate being thrown forward into position for engagement with the catch S by the inclined front edge of the latter, with which edge the lug $x$ engages as said section thus turns backward to place.

When a carrier B drops from a tilting track-section Q, it is received into a basket U, which is adapted to slide vertically upon the rods E beneath that portion of the platform C, and by means of a cord V and weight or spring is overbalanced sufficiently to cause it to remain at the upper limit of its motion until it receives a carrier, when the weight of the latter will cause said basket or drop to descend and to remain at the lower limit of its motion until relieved from such overweight, after which it will automatically return to its upper normal position.

In the drawings I have shown the cord V for elevating the basket U wound on the pulley V', which is to be provided with a spring $V^2$ in the ordinary and well-known way for rotating the pulley to wind up the cord to raise the basket again when such basket is relieved of the weight of the carrier.

In order that each carrier may pass all stations except that for which it is designed, the arm $r'$ of the locking-plate R of each station has a different relation to the line of the track A from that of either of the corresponding arms of the other stations, so that it will not be engaged by the arms $b^3$ of any of the carriers, except such as belong to such station. I accomplish such result preferably by varying the distance horizontally between said track and said arms $r'$; but the same result may be secured by varying the heights of the latter, the shortest being placed at the first station from the cashier's desk and the longest at the last station before reaching such desk.

In use of my apparatus a carrier sent from one station will pass down the track by any intervening stations and stop at the lower end at the desk of the cashier, where its contents will be removed and change inserted, if any is necessary, after which said carrier will be placed upon the upper end of said track, and from thence will pass downward along the same to the station from which it was sent, where it will drop into the basket and await attention from the clerk. It may sometimes occur that when passing around a curve in the track or from some cause a carrier will be thrown from the track. In order that a carrier thus displaced may be prevented from falling, a second wire W extends between the contiguous sides of the stations, which wire is parallel with outside of and preferably slightly above the track A. Each of the ends of said guard-wire is attached to a bracket X, that is secured to the platform C, and from thence extends in a curve upward, outward, and downward to or near the level of the track A, thence downward and inward for about one-half inch, and thence upward and inward to the point where the guard-wire is attached, such form being necessary, in order that no interference may be caused to the free passage of carriers.

Figure 4:
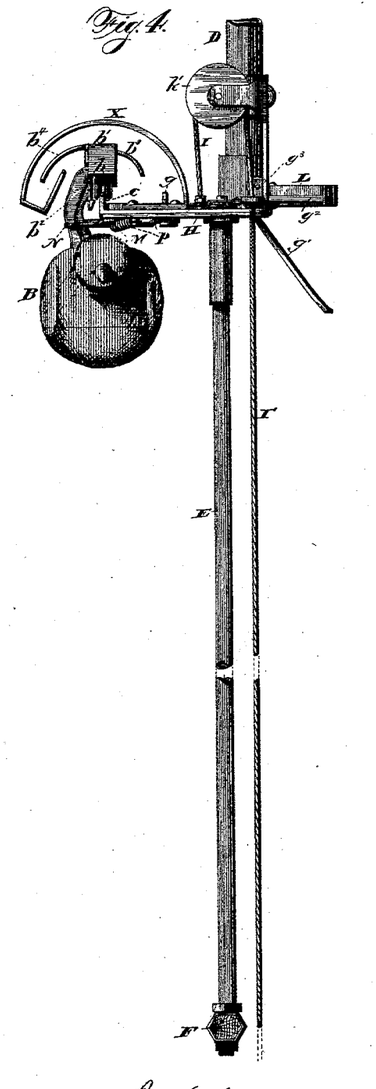
Fig. 4 is a like view of the same when the parts occupy the relative positions seen in Fig. 1.
Figure 5:
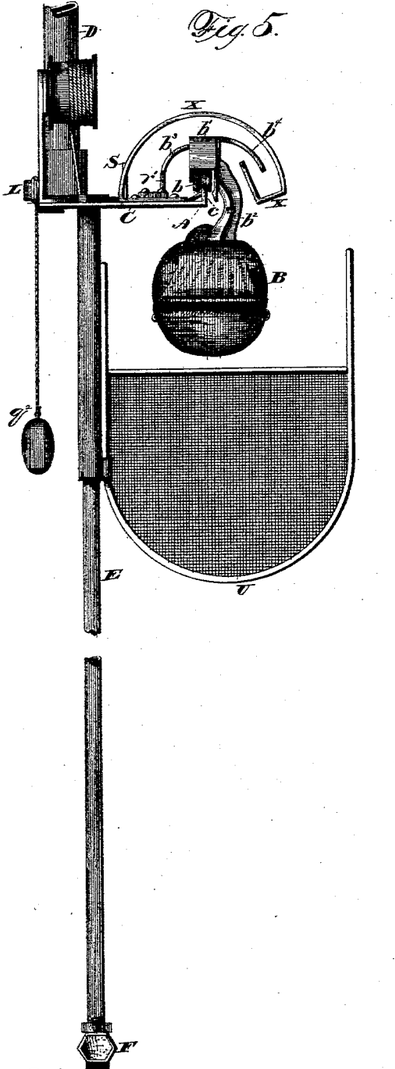
Fig. 5 is an end elevation of the drop portion of said station and shows the relative positions of parts seen in Fig. 2.
Figure 6:
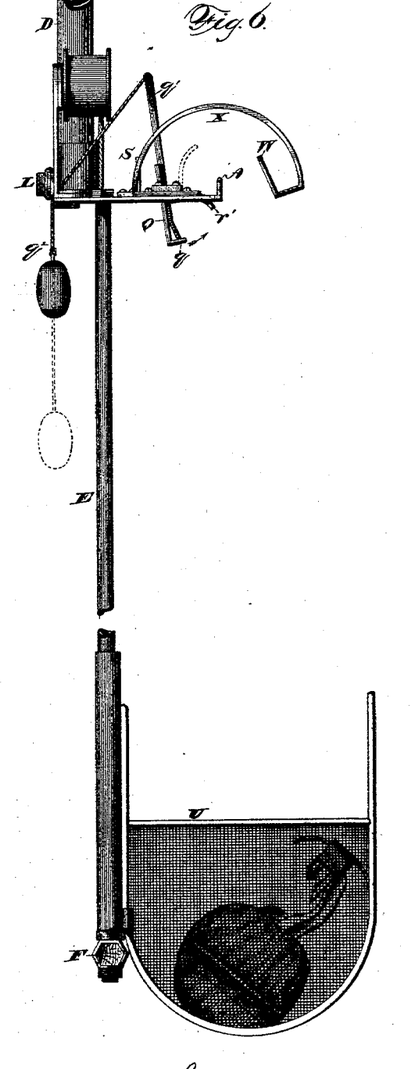
Fig. 6 is a like view of the same, showing the drop tilted and the basket with a carrier at the lower limit of its motion.
Figure 7:
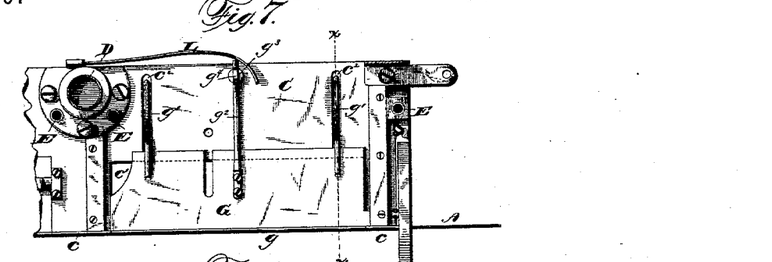
Figs. 7 and 8 are plan views of the upper side of the platform and movable table or track-section and show, respectively, said section in its normal closed position and when opened by the elevator.
Figure 8:
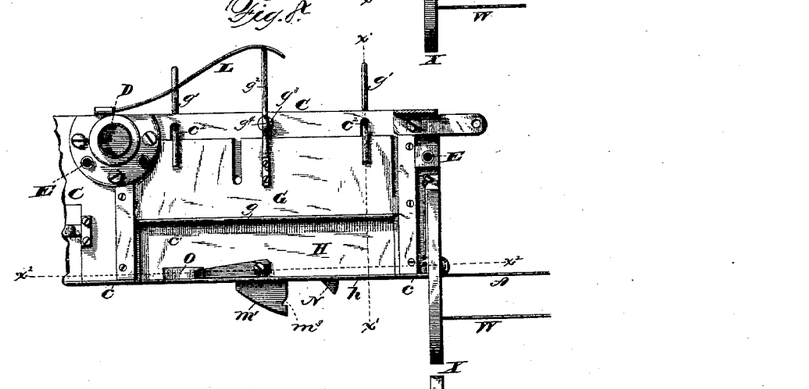
Figure 9:
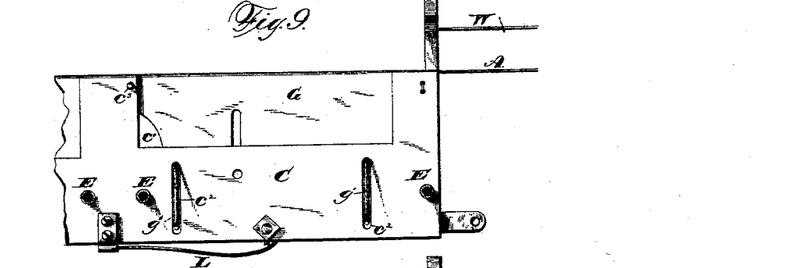
Figs. 9 and 10 are like views of the lower side of the same and show, respectively, the positions of parts seen in Figs. 7 and 8.

From the outer side, at the center of the roller-frame $b'$ of each carrier B, an arm $b^4$ extends in a curve outward and downward, and when said carrier is upon the track A occupies with relation to the guard-wire W the position shown in Fig. 4, so that if said carrier should leave said track or the latter should break, said arm $b^4$ would engage with said guard-wire and operate to suspend said carrier safely thereon.

I do not claim herein, broadly, a movable track-section for a carrier apparatus or movable table carrying such section, either alone or in combination with the carrier-elevator, and mechanism for moving the track-section or table away as the elevator rises, as such is fully covered by the claims in my pending application, Serial No. 193,992, nor do I claim herein anything covered by the claims in such other application.

Having thus described my invention, what I claim is—

1. In a cash-carrier apparatus having an inclined single track, a guard-wire arranged parallel with said track, in combination with a carrier which is provided with an arm that projects over said guard-wire and is adapted to engage therewith when said carrier leaves the track, substantially as and for the purpose specified.

2. In combination with the track having a gap, the sliding plate having a track-section to fill such gap, the fixed arm on such plate, the guide therefor, and the spring engaging the arm, substantially as and for the purpose specified.

3. In combination with the track having a gap, the sliding table provided with a track-section to fill such gap, a spring normally holding the table in position to fill the gap in the track with the track-section, the inclined arms on the table, and the carrier-elevator adapted to engage such arms as it is raised and move the table out of the way, substantially as described.

4. In combination with the carrier-elevator, the carrier provided with a shank or standard, the sliding bar provided with the lug $m'$, having a notch to engage the carrier-standard, and the spring for actuating the bar, substantially as described.

5. In combination with the carrier-elevator, the sliding bar thereon provided with the notched lug, the bar or arm pivoted to the elevator provided with a slot, a pin or screw on the sliding bar engaging such slot, and the spring for actuating such sliding bar, substantially as described.

6. In combination with the carrier having the notched shank, the elevator, the sliding bar thereon provided with a lug to engage such shank, the swinging arm on the elevator adapted to engage the notch in the shank on the side opposite to said lug, and a sliding connection between the sliding bar and such arm, whereby as the bar is moved rearward and forward the arm is swung to engage and disengage the forward side of the carrier-shank, substantially as described.

7. In combination with the carrier-elevator, the carrier provided with the shank notched on its forward and rear sides, the sliding bar provided with the notched lug to engage the notch in the rear side of the shank, the swinging arm on the elevator adapted to engage the notch on the front side of the elevator-shank, the spring for throwing the bar forward, and a sliding connection between the bar and the arm, whereby as the bar is thrown forward the arm is swung from the standard, substantially as and for the purpose specified.

8. In a cash-carrier having an inclined single track, the combination of a pivoted drop-table provided with a part of such track, a counterpoise for such table of sufficient strength to sustain it when unloaded, but yielding to the combined weight of the table and carrier, a vertically-reciprocating receptacle beneath the said table, a suspending-cord therefor, and a spring-actuated roller to which the said cord is connected, the spring thereof being of sufficient strength to lift the receptacle when empty, but being overcome by the combined weight of the receptacle and carrier, as described.

In testimony that I claim the foregoing I have hereunto set my hand this 22d day of January, 1886.

NELSON NEWMAN.

Witnesses:
GEO. A. SANDERS,
WILLIAM R. BOWERS.